United States Patent [19]

Abernathy, Jr. et al.

[11] 4,400,493

[45] Aug. 23, 1983

[54] POLYMERIZATION OF ISOBUTYLENE

[75] Inventors: Marshall W. Abernathy, Jr.; Kenneth C. Jurgens, Jr., both of Big Spring, Tex.

[73] Assignee: Cosden Technology, Inc., Dallas, Tex.

[21] Appl. No.: 366,116

[22] Filed: Apr. 7, 1982

[51] Int. Cl.³ .............................................. C08F 4/14
[52] U.S. Cl. .................................. 526/68; 526/348.7; 585/517; 585/520; 585/532
[58] Field of Search .................... 585/532, 517, 520; 526/68

[56] References Cited

U.S. PATENT DOCUMENTS 2,957,930  10/1960  Jackson ................................ 585/504
3,119,884  1/1964  Allen et al. ........................ 585/517

*Primary Examiner*—Stanford M. Levin
*Attorney, Agent, or Firm*—Russell H. Schlattman

[57] ABSTRACT

In the continuous catalytic polymerization of isobutylene, the exothermic heat of reaction is removed by vaporizing unreacted hydrocarbons, compressing and condensing the vaporized hydrocarbons to yield a liquid condensate at a pressure and temperature higher than that in the reaction zone, reducing the pressure on the liquid condensate to reduce its temperature to that of the reaction zone, separating any vapors thus formed and recycling the liquid condensate to the reaction zone. The process provides an energy efficient means of controlling reaction zone temperature. The process can be employed when using either a fluidized or fixed bed catalytic system.

5 Claims, 1 Drawing Figure

POLYMERIZATION OF ISOBUTYLENE

TECHNICAL FIELD

This invention relates to the liquid phase catalytic polymerization of isobutylene. More particularly, this invention relates to such a polymerization process characterized by energy efficient control and removal of the heat generated in the highly exothermic polymerization reaction.

BACKGROUND OF THE INVENTION

Polymers of isobutylene are well known. These relatively low molecular weight polymers range from slightly viscous oily liquids to very viscous liquids with a high degree of tackiness. Their uses include lube oil additive, electrical insulating oil, carrier for fertilizers, compressor lubricant and as additives for various adhesives, caulks and cosmetics. Polyisobutylenes are prepared commercially by the continuous polymerization of isobutylene contained in $C_2$–$C_5$ petroleum mixture which usually contains other olefins. The isobutylene contained in such a gas mixture is preferentially polymerized by passing the liquified $C_2$–$C_5$ feed through a reactor at a variably desired but constant temperature in the range of $-40°$ F. ($-40°$ C.) to $+125°$ F. ($52°$ C.) and a pressure of 0 to 150 psig (0 to 1034 kilopascals) in the presence of a catalyst. While a fixed bed catalyst can be employed, the preferred catalyst is finely divided aluminum chloride particles of critical particle size suspended in the liquified feed mixture passed through the reactor while simultaneously feeding a relatively smaller quantity of hydrogen chloride as a promoter or water, tert. butyl chloride or other substance which forms the promoter. After reaction, the reaction mixture is continuously removed, product polymer separated and purified, recovered catalyst and unreacted hydrocarbons recycled to the feed.

The polymerization reaction is highly exothermic. To complicate matters, maintaining a constant temperature during the reaction is a necessity as variations in reaction temperature will affect the molecular weight and viscosity of the polyisobutylene produced. Temperature control of such an exothermic, high flow rate, continuous reaction is exceedingly difficult. To accomplish this, prior art processes have employed some form of refrigeration of the reaction mixture. In U.S. Pat. No. 2,957,930 issued Oct. 25, 1960 to W. K. Jackson, a portion of the reaction zone mixture was continuously removed, cooled by refrigeration and returned to the reactor. In U.S. Pat. No. 3,119,884 issued Jan. 28, 1964 to J. R. Allen et al refrigerated cooling coils were placed in the upper vapor section of the reactor to cool and condense vapors formed during the reaction, the liquid condensate being returned to the reaction zone. While the prior art processes for controlling this exothermic reaction, as exemplified by the two previously mentioned patents, have proven to be successful from both a technical and commercial standpoint, the refrigeration systems required are extremely energy costly. It is the object of this invention to provide an improved, energy efficient means of controlling the reaction temperature in the continuous, liquid phase, catalytic polymerization of isobutylene. Other objects will become apparent from the description of the novel process contained herein.

BRIEF STATEMENT OF THE INVENTION

According to the novel process of this invention, in the continuous, liquid phase, catalytic polymerization of isobutylene contained in a $C_2$–$C_5$, and preferably $C_4$, hydrocarbon mixture, maintaining the reaction mixture at a constant desired temperature is facilitated by vaporizing unreacted hydrocarbon in the reaction zone in a quantity sufficient to remove the heat generated in the exothermic reaction, compressing and condensing the vaporized hydrocarbons to yield liquid condensate under a pressure and at a temperature higher than that maintained in the reaction zone, reducing the pressure on said condensate to the extent necessary to reduce the liquid condensate temperature to that of the reaction zone while at the same time vaporizing some of the hydrocarbons contained in said condensate, separating the vaporized hydrocarbons and recycling said liquid condensate to said reaction zone.

DESCRIPTION OF THE PREFERRED EMBODIMENT

Figure 1:
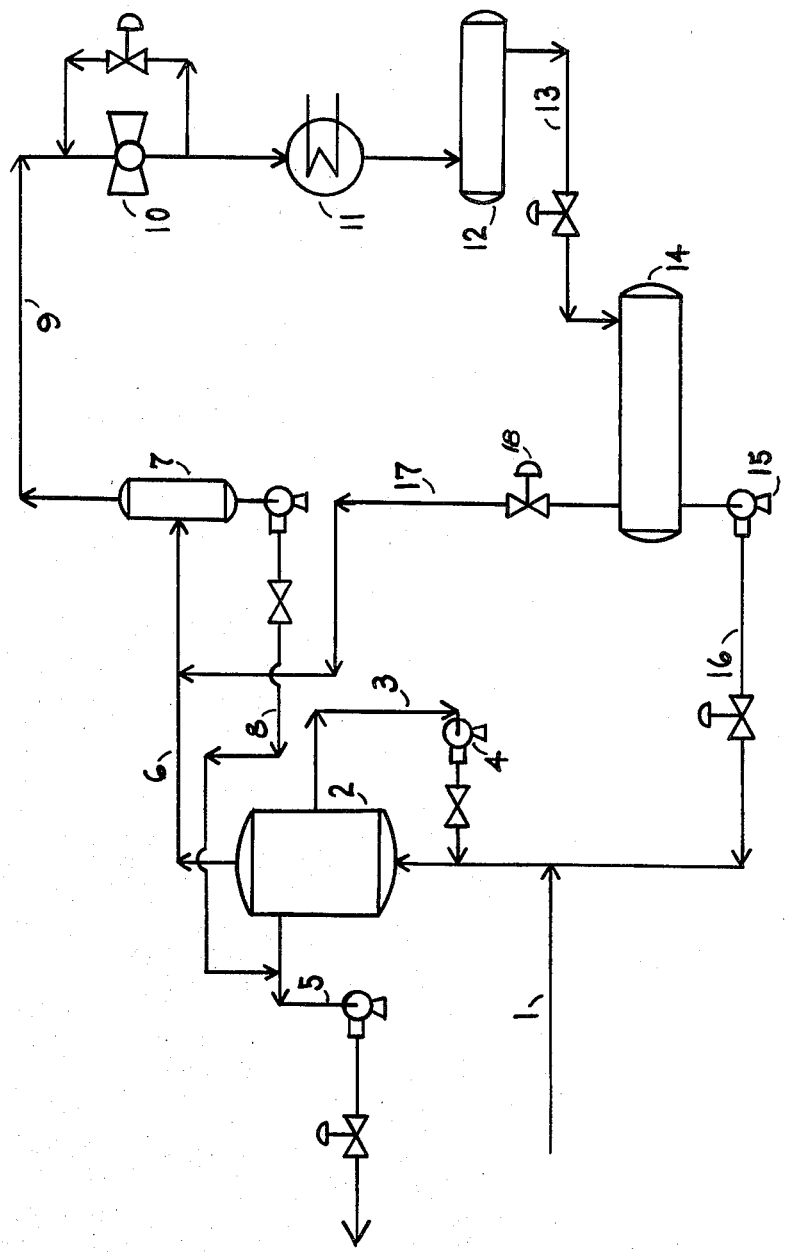
FIG. 1 is a schematic illustration of the continuous polymerization of isobutylene employing the novel process of this invention for energy efficient reactor temperature control.

Referring to FIG. 1, fresh liquid hydrocarbon feed and catalyst is introduced via line 1 to reactor 2 maintained at the proper temperature and pressure for the desired grade of polymer. To maintain a proper dispersion of the catalyst in the liquid reaction mass, a portion of the liquid reaction mixture is constantly withdrawn via line 3 and recycled by means of pump 4 back to the reactor 2. Normally, recycle rate is maintained at about 10 times the fresh feed rate. Liquid product polymer and unreacted liquid material is continuously withdrawn from the upper liquid zone of the reaction mass via line 5 from which the desired polymer is separated, purified and recovered. Vapors formed in the upper portion of the reaction zone as a result of the exothermic reaction are withdrawn via line 6 at a rate to maintain a vapor temperature approximately equal to the reaction temperature. The vapors so removed enter knock-out drum 7 to remove entrained liquids which are directed via line 8 to polymer recovery. If desired, the entrained liquids can be returned to the reactor.

Vapors from knock-out drum 7 flow via line 9 to compressor 10 and condenser 11 and the liquid condensate, at a temperature and pressure in excess of that in the reactor collected in receiver 12. This receiver is maintained liquid-full. In fact, in normal operation the liquid level will extend back into the condenser.

Liquid condensate from receiver 12 flows via line 13 to flash drum 14. In flash drum 14, the pressure is controllably reduced by means of valve 18 to reduce and maintain the temperature of the liquid condensate at the reaction temperature. Liquid condensate from flash drum 14 is recycled to the reactor by means of pump 15 through line 16. Vapors from flash drum 14 are recycled to the reactor vapor effluent through line 17.

As a specific illustration of the novel process of this invention, polyisobutylene having a molecular weight of 940 was produced in accordance with the schematic description set forth above.

The fresh feed stream was a $C_4$ hydrocarbon mixture containing 20% by weight of isobutylene and approximately 20 ppm H₂O. The feed stream was cooled to a temperature 65° F. (18° C.). A catalyst slurry was prepared made up of three volumes of polyisobutylene having a viscosity of 400–600 SSU at 210° F. (99° C.) and one volume of finely divided aluminum trichloride particles.

The catalyst slurry and liquid hydrocarbon condensate recycle were combined with the fresh feed stream and continuously fed to the bottom of the reactor. The total composition to the reactor consisted of approximately 50.2 parts of fresh feed, 0.2 parts of catalyst slurry and 49.6 parts of liquid hydrocarbon condensate recycle, all parts being expressed as parts by weight. Total fresh feed to the reactor was approximately 50 gallons (189 liters) per minute. To maintain the catalyst dispersion, liquid was constantly withdrawn from the upper portion of the reactor and recycled to the fresh feed inlet at a rate of approximately 550 gallons (2082 liters) per minute. A liquid product stream from the upper portion of the reactor was also continuously withdrawn for subsequent recovery and purification of the polyisobutylene formed.

A constant liquid level was maintained in the reactor. The exothermic reaction generated vapors of unreacted hydrocarbons in the upper vapor zone of the reactor. Pressure in the reactor was maintained at 24 psig (165 kilopascals). Temperature throughout the reactor, including the vapor zone, was maintained at 65° F. (18° C.) by the continuous withdrawal of the hydrocarbon vapors formed. These vapors flowed to the knock-out pot where any carry over liquid was separated and added to the liquid reactor stream being withdrawn and sent to polymer recovery.

The hydrocarbon vapors then passed to the compressor and water cooled condenser producing a condensate at a pressure of 60 psig (414 kilopascals) and a temperature of 105° F. (41° C.) which was collected in the high pressure receiver. To maintain the receiver liquid full, the liquid condensate level extended back up into the condenser.

The liquid condensate was passed to the flash drum. The pressure was there controllably released to reduce the temperature of the liquid condensate to 65° F. (18° C.). The liquid condensate was recycled to the fresh feed system to the reactor and the vapors recycled to the vapor effluent of the reactor.

The continuous polymerization of isobutylene process of this invention is subject to substantial variations depending on the type of polymer desired. A feedstock of isobutylene contained in a C₂–C₅ hydrocarbon mixture can be employed. Preferred results are obtained using a feed stream consisting essentially of C₄ hydrocarbons. The isobutylene content of such a feedstock can also be substantially varied, the balance of C₄'s being butane and other butenes. Particularly useful isobutylene concentrations for a particular molecular weight (MW) grade of polymer are as follows:

| Grade | % by weight isobutylene |
|---|---|
| 340 MW | 18% |
| 940 MW | 20% |
| 2700 MW | 22% |

The reaction temperature can also be substantially varied. Temperatures in the range of from about −40° F. to about +125° F. (−40° C. to 52° C.) can be used. Preferred temperatures are in the range of from about 35° F. (2° C.) to about 125° F. (52° C.) and depend on the grade of polymer desired as shown in the following table:

| Grade | Reactor Temperature |
|---|---|
| 340 MW | 100° Min. (38° C.) |
| 940 MW | 65° F. Max. (18° C.) |
| 2700 MW | 35° F. (2° C.) |

Reaction pressure can also be substantially varied. Generally, pressures will range from about 0 to 50 psig (0 to 345 kilopascals) although pressures as high as 150 psig (1034 kilopascals) can be used.

The preferred catalyst for the reaction is finely divided particles of aluminum trichloride, activated with HCl, either separately injected or formed in situ as, for example, by reaction of the catalyst with water contained in the hydrocarbon feed stock. The catalyst can conveniently be injected as a slurry of aluminum trichloride in a liquid polyisobutylene. This catalyst slurry can be injected either into the hydrocarbon feed stream to the reactor or separately directly into the bottom of the reactor.

While the use of a fluidized catalytic bed constitutes the preferred embodiment of this invention, the novel process described herein is equally applicable to a polymerization process employing a fixed catalyst bed.

According to the process of this invention, the vapor effluent from the reactor is compressed and condensed to provide liquid condensate at a pressure and temperature in excess of that maintained in the reactor. Generally, a liquid condensate having a temperature of at least 105° F. (41° C.) and a pressure of at least 60 psig (414 kilopascals) will be appropriate for most grades of polymer being produced. Temperature and pressure conditions of the condensate must be such to permit flashing of sufficient vapors to lower liquid condensate temperature to reaction temperature. Separating the vaporized hydrocarbons and recycling only liquid condensate to the reaction zone at reaction temperature facilitates temperature control in the reactor. The amount of condensate that is so recycled will vary with the grade of polymer being produced. For low molecular weight polymers, the rate of condensate recycle will approach the rate of fresh feed while in the case of high molecular weight polymers, recycle rate can be as low as approximately one-third of the feed rate. In the preferred operations of this process, the vaporized hydrocarbons produced in the flashing step are recycled to the vapor effluent from the reactor.

What is claimed is:

1. In a process for the continuous, liquid phase, catalytic polymerization of isobutylene contained in a hydrocarbon feed mixture, wherein the hydrocarbon feed mixture is continuously introduced into a reaction zone containing aluminum trichloride catalyst and maintained at a constant controlled reaction temperature and pressure, and a portion of the liquid reaction mixture continuously removed to recover the polyisobutylene contained therein, the improvement in maintaining the desired reaction temperature which comprises vaporizing unreacted hydrocarbons in the reaction zone in a quantity sufficient to remove the heat generated in the exothermic reaction, continuously removing, compressing and condensing said vaporized hydrocarbons to yield a liquid condensate under a pressure and at a temperature higher than that maintained in the reaction zone, reducing the pressure on said condensate to the extent necessary to vaporize some of the hydrocarbons in the condensate thereby reducing the temperature of the liquid condensate to that of the reaction zone, separating the vaporized hydrocarbons and recycling the liquid condensate to the reaction zone.

2. In a process for the continuous, liquid phase, fluidized bed, catalytic polymerization of isobutylene contained in a hydrocarbon feed mixture, wherein the hydrocarbon feed mixture and aluminum trichloride catalyst are continuously introduced into a reaction zone maintained at a constant controlled reaction temperature and pressure and a portion of the liquid reaction mixture continuously removed to recover the polyisobutylene contained therein, the improvement in maintaining the desired reaction temperature which comprises vaporizing unreacted hydrocarbons in the reaction zone in a quantity sufficient to remove the heat generated in the exothermic reaction, continuously removing, compressing and condensing said vaporized hydrocarbons to yield a liquid condensate under a pressure and at a temperature higher than that maintained in the reaction zone, reducing the pressure on said condensate to the extent necessary to vaporize some of the hydrocarbons in the condensate thereby reducing the temperature of the liquid condensate to that of the reaction zone, separating the vaporized hydrocarbons and recycling the liquid condensate to the reaction zone.

3. The process of claim 2, wherein the hydrocarbon feed mixture is a mixture of $C_2$–$C_5$ hydrocarbons.

4. The process of claim 2, wherein the hydrocarbon feed mixture consists essentially of $C_4$ hydrocarbons.

5. The process of claim 4, wherein the reaction temperature is maintained in the range of from about 2° C. to about 52° C.

* * * * *